United States Patent [19]
Lemelson

[11] Patent Number: 4,984,113
[45] Date of Patent: Jan. 8, 1991

[54] INFORMATION STORAGE AND REPRODUCTION APPARATUS AND METHOD EMPLOYING A FLEXIBLE BELT RECORD MEMBER

[76] Inventor: Jerome H. Lemelson, 868 Tyner Way, Call Box 14-286, Incline Village, Nev. 89450

[21] Appl. No.: 456,219

[22] Filed: Dec. 20, 1989

Related U.S. Application Data

[63] Continuation of Ser. No. 38,706, Apr. 15, 1987, abandoned.

[51] Int. Cl.$^5$ .................... G11B 15/18; G11B 23/04; G11B 21/02; H04N 5/78
[52] U.S. Cl. ................................ 360/101; 360/10.1; 360/71; 360/132
[58] Field of Search ......................... 360/10.1

[56] References Cited

U.S. PATENT DOCUMENTS

| | | | |
|---|---|---|---|
| 3,465,320 | 9/1969 | Weidenhammer et al. | 360/101 |
| 3,810,238 | 5/1974 | Staar | 360/88 |
| 4,071,863 | 1/1978 | Alexandrescu | 360/101 |
| 4,477,851 | 10/1984 | Dalziel et al. | 360/132 |
| 4,578,717 | 3/1986 | Lemelson | 360/2 |
| 4,717,090 | 1/1988 | Smith et al. | 360/95 |

Primary Examiner—Robert S. Tupper
Attorney, Agent, or Firm—Neil F. Markva

[57] ABSTRACT

An apparatus and method for magnetically transducing information with respect to select portions of selected of a multitude of parallel record tracks on an elongated magnetic record member such as a flexible magnetic belt which is supplied from a coiled formation thereof stored in an elongated magazine or cartridge. The magazine is removably secured in or against a housing containing transducing means and means for automatically engaging a free end of the magnetic belt and driving same from its housing along a select path to position a select portion of the length of the belt at a transducing location. A magnetic transducer is automatically aligned with a select track of the belt and is driven along such select track while it is energized to either record information along or reproduce previously recorded information from the select portion of the select track of the belt. If the select portion of the belt is located a distance from the free end thereof, the free end of the belt and a select portion thereof is allowed to roll or fold into a container for temporary storage until transducing operations are finished and the belt is automatically returned to its container. The invention also resides in improvements in the construction of the magazine storing the belt and the method employed to position the magazine, remove and drive its belt and locate same with respect to the transducing means.

18 Claims, 2 Drawing Sheets

INFORMATION STORAGE AND REPRODUCTION APPARATUS AND METHOD EMPLOYING A FLEXIBLE BELT RECORD MEMBER

SUMMARY OF THE INVENTION

This is a continuation of application Ser. No. 038,706, filed Apr. 15, 1987, now abandoned.

This invention relates to an improved apparatus and method for recording and reproducing recorded information and in particular to such an apparatus which employs a flexible magnetic belt containing a multitude of closely spaced record tracks, which belt is long enough to effect the recording of a plurality of frames of information along each of the multitude of tracks. By employing such a record member and transducing arrangments for recording frames of information along select portions of the length of the belt, rapid access to substantially large quantities of information, such as digital data, may be had in relatively short average access times at low cost.

It is known in the art to record large amounts of data along one or more record tracks of a magnetic tape. Computer magnetic tapes generally extend twelve hundred feet or more in length and, as a result of such length, require relatively long periods of time to access information or attain select portions of the length thereof for recording along. Magnetic cards and apparatus for reading and recording thereon are disclosed in my U.S. Pat. Nos. 3,818,500; 3,943,563; 3,803,350; 4,084,198; 4,212,037; 4,231,162 ; 4,578,717 and 4,642,705. The amount of information recorded on such cards is limited to the size and recording areas of the cards. While 50 to 100 megabytes of data may be recorded on both sides of a magnetic card with is letter size, the recording of certain types of data such as digital signals representing computerized axial tomagraphic (CAT) scans of the human body requires substantially larger recording area than exists on a single card of a size which may be practically handled by a machine.

The instant invention overcomes the shortcomings of a system employing single magnetic cards of relatively short length and the time access problem associated with conventional magnetic tapes of limited width by providing as a record medium, a wide magnetic belt which preferably, although not necessarily, is between five and twelve inches in width and two to six feet long, thus permitting between 100 and 300 megabytes of data or more to be recorded on a sheet of magnetic recording material which is eight to ten inches wide and to be accessed or selectively reproduced in an average time after a container of such belt is operatively disposed in a reading apparatus.

The instant invention employs such a wide flexible magnetic recording belt wound on an elongated spool which is rotationally supported in such a container and drivable therefrom through a door or opening in the container after the container is aligned in a retainer or passageway forming part of a housing for a magnetic transducing apparatus. Such transducing apparatus may merely read selected recordings from the belt and/or record selected information, such as digital data generated by a computer, graphics or image digitizer, the output of a television camera or the processed results of video scanning or from a memory which is selectively addressed just prior to recording selected information signals reproduced therefrom. Selective reproduction of information signals recorded along select portions of select parallel tracks of the belt and/or the selective recording of select messages, frames or blocks of information is effected after a select portion of the length of the belt is predeterminately located at a transducing or recording location. The select portion may be a select frame or frame location thereof, containing a multitude of parallel record tracks which may be extensions of similar parallel record tracks extending parallel to the longitudinal axis of the belt along other frame lengths thereof.

One or more magnetic transducers at such location are moved into operative alignment with a select one of the multiple tracks of the belt. Two forms of magnetic belt transducing apparatus and a number of types of belt-containing magazines employable with such apparatus are illustrated in the drawings. Either apparatus of which may be employed with or without suggested modifications thereto, to effect automatic recording and reproduction operations with respect to select portions of select record tracks of the belt presented to the magnetic transducing apparatus.

Accordingly, it is a primary object of this invention to provide new and improved apparatus and method for recording and reproducing large quantities of information.

Another object is to provide an apparatus and method for recording large quantities of data on a single record unit, such as an elongated flexible card or belt and reproducing selected amounts of such data with minimum access time.

Another object is to provide an apparatus and method for effecting high density magnetic recording on a flexible magnetic belt having a plurality of recording areas including parallel record tracks extending the length of such belt wherein both longitudinal movement of the belt and lateral movement of a magnetic transducer is employed to selectively transduce with respect to select recording areas of the belt.

Another object is to provide an apparatus and method for magnetically recording with respect to a record member driven past a movable transducer wherein both the transducer and the record member are controllably and simultaneously driven to bring the transducer into operative alignment with a select recording area of the record member to substantially reduce the time required to effect a transducing operation.

Another object is to provide an apparatus and method for selectively recording and reproducing extremely large amounts of information at low cost.

Another object is to provide a magnetic recording system and method employing magazines containing elongated lengths of sheets or belts of magnetic recording material and reading apparatus for information recorded along select portions of such magnetic material including means for removing and controllably driving a select length of such record material to a reading location.

Another object is to provide improvements in the construction and operation of magazines or cartridges containing flexible record members.

Another object is to provide a magazine containing an elongated flexible record member stored therein in a manner whereby it may be easily paid out therefrom for use in scanning a select portion or portions of said record member and may be easily returned to the magazine housing for storage therein.

Another object is to provide an apparatus and method for recording and storing substantially large amounts of record information, such as digitized image information, on a plurality of record members as frames of information in a manner whereby select frames are easily and rapidly accessible for reproduction and display.

Another object is to provide an apparatus and method for magnetically recording digitized video picture signals on a plurality of record members and selectively reproducing selected one or ones of said video picture signals as viewable still images in a minimum average access time.

Another object is to provide an apparatus and method for magnetically recording digital image signals of a plurality of frames of computerized axial tomography scannings on a plurality of record members and rapidly accessing same for viewing.

Another object is to provide an apparatus and method for magnetically recording digital image signals of a plurality of frames of computerized axial tomography scannings of the body of a living being on a single record member whereby a radiologist may rapidly access any particular scanning or frame in a minimum average access time.

Accordingly, it is a primary object of this invention to provide a new and improved recording and reproduction apparatus and method employing an elongated flexible belt as a record medium, which belt is wound in a coil in a cartridge or magazine housing and is controllably driven therefrom.

Another object is to provide an apparatus and method for magnetically transducing information with respect to a select portion of the length of an elongated magnetic belt which is controllably driven from a container therefor to dispose select portions thereof at a transducing location and to preposition each of said select portions with respect to a transducing means at said select location.

Another object is to provide an automatic transducing apparatus for information recorded along the length of a flexible record belt which is wound on a roll or spool rotationally supported within a housing and is pulled through an opening in the housing to locate a select portion of the belt at a transducing location, wherein means is provided for automatically opening and sealing the narrow opening in said housing.

Yet another object of this invention is to provide a new and improved apparatus and method for transducing information with respect to elongated sheet-like record members, such as relatively wide magnetic tapes and electro-optically scannable record members which are stored in a magazine and select lengths thereof are accessible for transducing operations by controllably driving same from the magazine and operatively disposing such select lengths with respect to transducing means.

Another object of the invention is to provide a new and improved apparatus and method for transducing information with respect to elongated sheet like record members, such as relatively wide magnetic tapes and electro-optically scannable record members which are stored in a magazine and select lengths thereof are accessible for transducing operations by controllably driving same from the magazine and operatively disposing such select lengths with respect to transducing means and controllably operating said transducing means to cause it to operatively move laterally across the width of the select length and transduce information with respect to one or more select record tracks thereof.

Another object is to provide an apparatus and method for magnetically recording substantially large amounts of information, such as frames of digitized image data, on flexible record members, which data is rapidly accessible for reproduction and display.

Another object is to provide an apparatus and method for storing large numbers of frames of image information on a record member, such as a flexible magnetic belt having the storage capacity of a substantially larger quantity of magnetic tape wherein the average access time to attain a select frame of such data is substantially less than the average access time for the reproduction of select frames of a similar number of frames of information recorded on a conventional magnetic tape.

With the above and such other objects in view as may hereinafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

DETAILED DESCRIPTION

Figures 1, 2, 5:
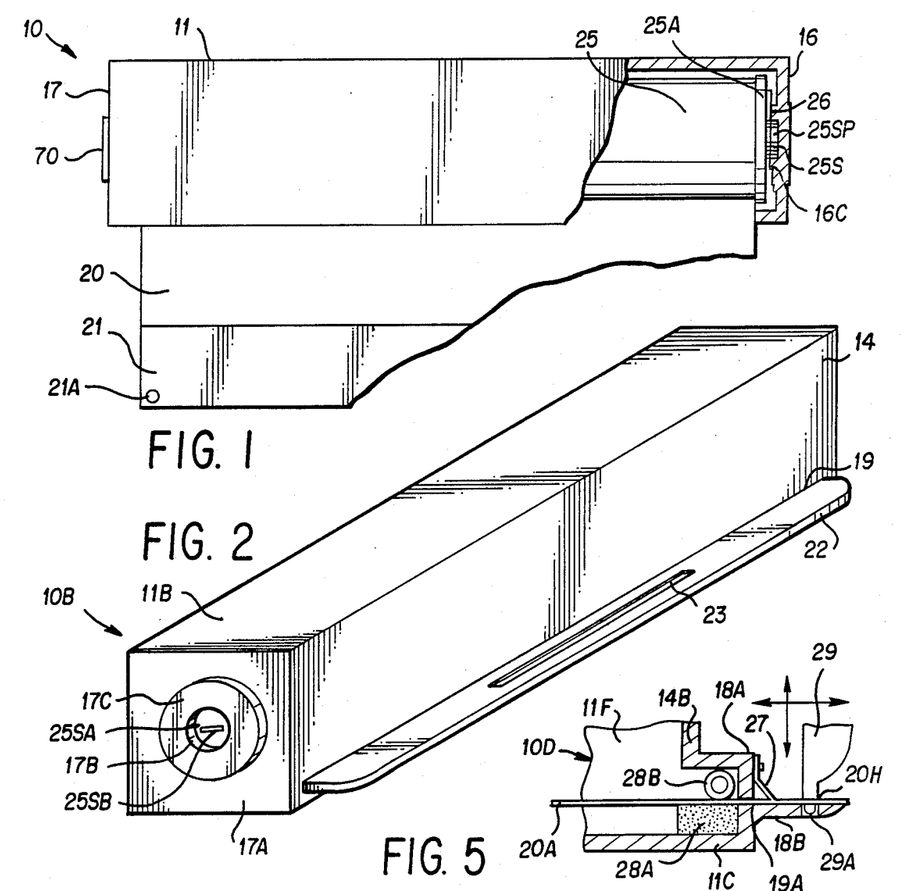
FIG. 1 is a plan view with parts broken away for clarity of a magazine for a magnetic belt containing a multitude of parallel record tracks for high density magnetic recording.
FIG. 2 is an isometric view of a magazine which contains modifications to the magazine of FIG. 1.
FIG. 5 shows modifications to the magazines of FIGS. 1 to 4 in a fragmentary cross section of a magazine according to the invention.

FIGS. 1 and 2 illustrate details of a magazine or cartridge for storing an elongated flexible record member, such as a wide magnetic belt 20 within an elongated housing 11 which is slightly longer than the width of belt 20. The housing 11 has a rectangular, box-like configuration and is preferably injection molded in two or more sections of a suitable rigid plastic, such as polycarbonate resin. Housing 11 provides rotational support for an elongated spool or drum 25 on which most of the length of the flexible record belt 20 is wound during storage therein. An elongated slot-like opening 19 is formed in a side wall 14 of housing 11 and is slightly longer than the width of belt 20 which is driven therethrough.

Drum 25 is supported for rotation by a shaft 25S or integrally molded cylindrical extensions of the end walls of drum 25. Shaft 25S or extensions are rotationally supported within respective bearings or cylindrical receptacle cavities 16C shown in FIG. 1 formed in end walls 16 and 17 of housing 11. The ends of the drum 25 include flanges 25A of greater diameter than the central portion of drum 25 to retain and center flexible magnetic belt 20 coiled thereon. The drum 25 may be tensionally rotated in a winding action for flexible belt 20 by a coil spring 25SP secured to and extending through the drum or from the end walls thereof to end walls 16 and 17 between which the spring or springs are fastened to provide a constant winding force for drum 25.

If magnetic belt 20 is formed of a thin flexible sheet of plastic, such as one mil thick polyester resin, such as Mylar or the like, a strip 21 of more rigid and thicker plastic sheet may be welded or solvent bonded to the end of belt 20 to facilitate its engagement, handling and driving from housing 11 during a recording and/or reproduction operation with respect to one or more portions of select tracks of belt 20. Strip 21 which may comprise suitable plastic sheet 0.003" to 0.005" in thickness and may be between 0.5" to 2.0" wide providing sufficient length to permit it to be gripped and driven. One of a plurality of holes 21A extend along either or both lateral border portions of strip 21 and may be engaged by teeth of a wheel or fingers of a mechanism to be described to dispose belt 20 between powered rollers for driving belt 20 from housing 11.

While belt 20 may be made of sheet material which is about one mil thick, it may also be made of heavier plastic, such as Mylar having a thickness of several thousandths of an inch or greater. Such a thicker belt 20 will not require a tab or more rigid strips of plastic at its free end, to facilitate belt handling and driving functions.

The embodiment illustrated in FIG. 1 employs one or more coiled springs connected between drum 25 and end walls 16 and 17 of elongated housing 11 to retain tension on belt 20 to be rewound in a coil formation on drum 25. In FIG. 2, magazine 10B includes a housing 11B having an end wall 17A which is internally recessed to receive an end of a specially shaped shaft 25SA or cylindrical extension of drum 25 for rotationally supporting same within housing 11B. The central portion of the end of shaft 25SA contains a radially extending elongated cavity or slot 25SB exposed to the exterior of housing 11B through a circular opening 17B in end wall 17A. This construction will permit a driving member [now shown] in the form of a power rotated shaft having a radially extending protrusion or blade at its end to be inserted through opening 17B for engaging such extension in cavity 25SB so as to permit it to drive the supporting shaft for drum 25 in both directions when magazine 10B is operatively located in or on a transducing assembly as described hereafter. Such motor driven mechanism may be computer controlled in its operation to effect or permit (A) driving movement of magnetic belt 20 with tab 22 through opening 19 in wall 14 of housing 11B, and (B) driving return movement of belt 20 therethrough to be wound on the power rotated drum 25. By computer controlling the rotation of drum 25 and one or more pairs of belt driving rolls located outside housing 11B, a select tension may be maintained on belt 20 both during its movement out of housing 11B and rewinding same on drum 25 for storage in housing 11B. Furthermore, such computer controlled drum rotation may also be employed to predeterminately locate the end of the belt 20 at an operative location within or immediately adjacent the opening 19 during storage, as illustrated in FIG. 2.

Figures 3, 4, 6:
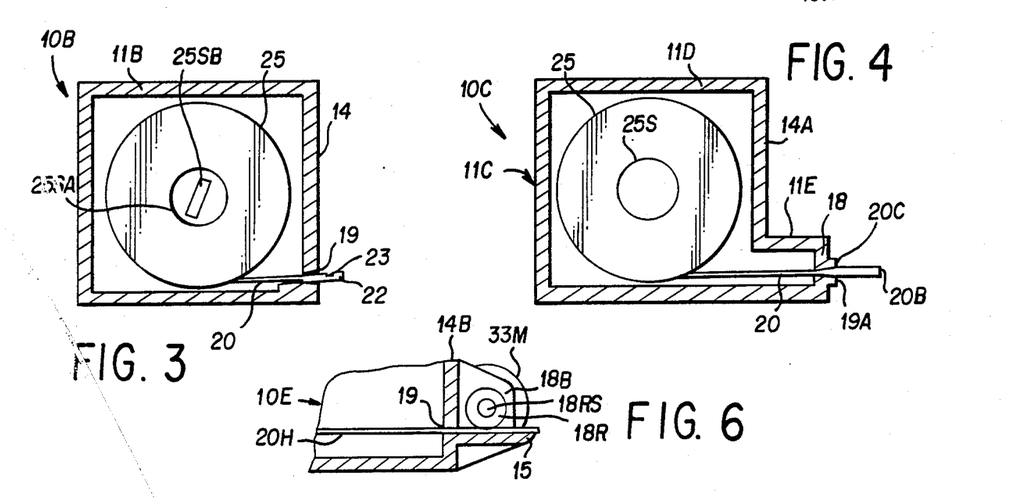
FIG. 3 is an end view in partial cross section of the magazine of FIG. 2.
FIG. 4 is an end view in partial cross section of a magazine which is a modified form of that shown in FIG. 3.
FIG. 6 is a fragmentary cross sectional view of a magazine housing of the types shown in FIGS. 1 to 4 showing a drive means for the belt attached to the housing.

FIG. 3 illustrates further details of magazine 10B and the magnetic recording member 20 of FIG. 2. Rigid strip 22 is welded or bonded to the end of flexible record member 20 and is tapered in the direction of belt 20. Strip 22 is shown frictionally wedged between tapered upper and lower walls of the elongated opening 19 in wall 14. Such an assembly performs a number of functions including retention of the free end of belt 20 in place and under tension thereby sealing the elongated opening 19 against moisture and dust and providing the end of belt 20 at a predetermined location to permit it to be easily engaged and pulled from housing 11B. An elongated channel or cavity 23 formed in the upper surface of elongated strip or tab 22 and may be gripped by a lip portion or extension of a gripper or finger forming part of a mechanism for automatically removing and driving belt 20 from the drum 25.

In FIG. 4 magazine 10C is defined by a housing 11C formed of two portions. A drum containing portion 11D holds drum 25 rotationally supported therein and a second portion 11E is smaller in cross section than the first portion 11D and protrudes from the lower end of side wall 14A of housing portion 11D. The magnetic belt 20 is shown guided through projection portion 11E and elongated opening 19A in the end wall 18 thereof. Belt 20 is connected at its end to a rigid plastic strip 20B having a tapered end portion 20C secured to the end of belt 20 and frictionally engaged within and against the edge walls of opening 19A to seal such opening. Strip 20B may contain one or more holes extending therethrough to be gripped by a finger or spoke of a wheel in driving the belt assembly from housing 11C to further drive rolls forming part of the transducing apparatus. Projection portion 11E may serve to properly align housing 11C of magazine 10C with a receptacle in a transducing apparatus and to dispose the tab or strip 20B operatively aligned with an engaging and driving mechanism as described.

In FIG. 5 belt magazine 10D is defined by an elongated housing 11F and a subhousing portion 11G extending from the lower side wall 14B thereof with a slotted or elongated opening 19A through the end wall 18A. Magnetic tape 20A extends from a coil formation thereof wound on a drum of the type described and through the opening 19A along the upper surface of a platform extension 18B of end wall 18A. Record member 20A may be made of polyester resin in a thickness of several thousandths of an inch or more causing it to lie flat on the upper surface of shelf extension 18B thereby permitting a spring-like detent 27 or a plurality of such detents secured to the end wall 18A near the ends of the opening 19A, to engage the borders of the record belt 20A. Thus, detents 27 retain record member 20 against the upper surface of shelf extension 18B and prevent record member 20 from being completely driven into the housing 11F during its return drive onto the storage drum within housing 11F.

Also shown in FIG. 5 is part of a mechanism 29 including a finger extension 29A thereof extending through an opening or hole 20H in the endmost portion of belt 20A to permit such mechanism to pull belt 20A out of housing 11F and dispose it between powered rollers after housing 11F is operatively located on or in a transducing apparatus as described hereafter. A strip 28A of resilient material, such as felt or cellular plastic, is secured within subhousing 11G and disposed beneath belt 20A in alignment with a free wheeling roll or series of wheels 28B supported within subhousing 11G for guiding and maintaining a frictional grip on belt 20A. In lieu of the mechanism 29, the roller or drive wheels 28B may be power-operated by a motor driven mechanism supported by the apparatus with which the magazine is operatively coupled for transducing operations. Such driving movement may also be effected by a wheel or roller which is automatically moved into engagement against the portion of the belt 20A aligned on the upper surface of shelf extension 18B upon the operative location of housing 11F of the magazine within or against the magnetic transducing apparatus employed to record on and/or reproduce from the magnetic belt 20A as described hereafter.

In the embodiment of FIG. 6, a magnetic belt 20H of the type described is pulled from a coil formation thereof on a drum within an elongated storage housing 10E of the type described. The operative driving movement is effected by a plurality of belt border gripping rolls or drum 18R rotationally supported for free wheeling rotary movement outside housing 10E. Protruding laterally from the side wall 14B of housing 10E is a shelf extension 15 aligned with an elongated opening 19 through which the belt 20H passes. The shaft 18RS of the drum or wheels 18R is supported at its ends by a pair of bracket formations 18B, one of which is shown in FIG. 6. Bracket formations 18B protrude laterally from and are integrally molded with the side wall 14B of housing 10E.

Also illustrated in FIG. 6 is a reversible gear motor 33M which is movably supported for axial movement by the housing of the transducing apparatus and contains a coupling [not shown] on the end of its shaft which is operable to engage the shaft 18RS of the drive roll 18R when the entire motor assembly 33M is axially driven by a solenoid or motor to effect such coupling after the magazine housing 10E is operatively located in the transducing apparatus.

Figures 7, 9, 10:
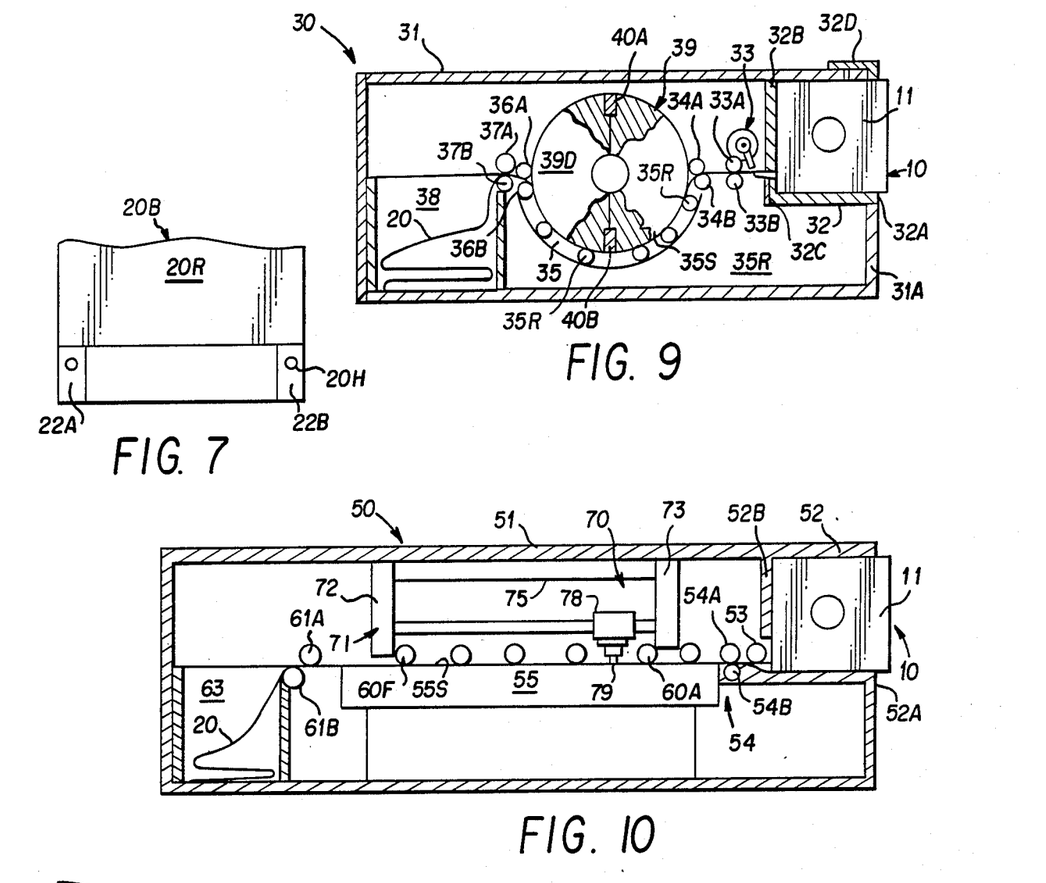
FIGS. 7 and 8 are fragmentary plan views of end portions of magnetic belts usable with the magazines of FIGS. 1 to 6.
FIG. 9 is a sectional view with parts broken away of a first type of transducing apparatus and a magazine therein according to the invention.
FIG. 10 is a sectional view of another form of transducing apparatus with a magazine operatively positioned therein.

In FIG. 7 is shown a modification to the end of the one mil record belt 20B permitting the central portion thereof to be operatively driven through a transducing arrangement of the type illustrated in FIG. 9 to be described. Two narrow strips are made of plastic sheet which is greater in thickness and stiffer than the one mil film defining the record belt 20 of the earlier embodiments. The narrow strips are shown adhesively bonded or welded to border portions of belt 20B and each contains a respective hole 20H extending therethrough to permit it to be engaged by fingers of a mechanism operable to pull belt 20B out of the housing. The central recording portion 20R of belt 20B is thus void of obstructions to facilitate driving and passing belt 20B through a narrow passageway prior to a transducing operation as described hereafter.

Figures 8, 11:
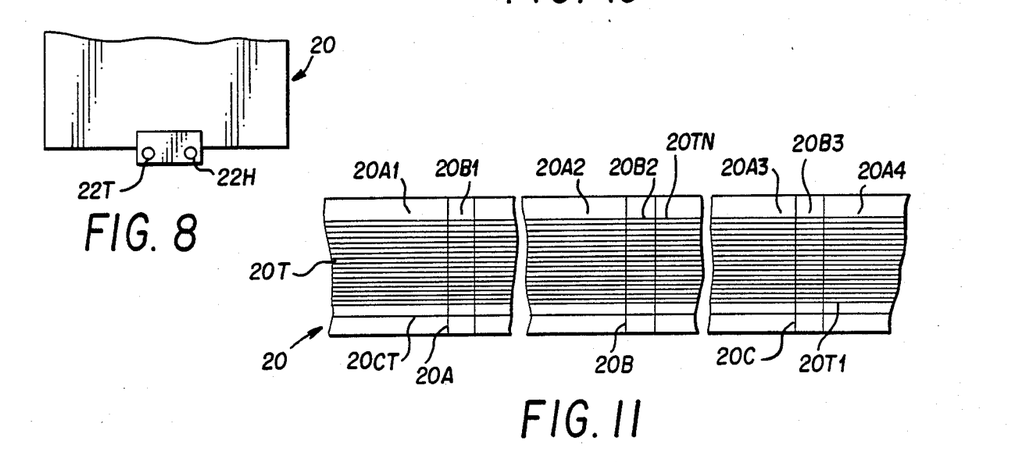
FIG. 11 is a fragmentary plan view of a magnetic record belt showing recording arrangements for use in the apparatus of FIGURES.

FIG. 8 shows a modified form of record belt 20 having a stiff pad 22T made of rigid plastic and centrally secured to the end thereof. Two holes 22H are provided in the end portion of tab 22T to permit a two finger or spoked gripper to engage tab 22T and to apply a longitudinal driving force to belt 20 along a select path to position a select portion of belt 20 in alignment with a transducing apparatus as described hereafter.

FIG. 9 shows details of a magnetic transducing apparatus 30 operable for recording and/or reproducing select information on a select portion of a select parallel record track of a wide magnetic tape or belt 20 of the type described. Belt 20 is fed from a housing 11, such as a magazine or cartridge 10 having features of those illustrated in FIGS. 1 to 6. The apparatus 30 comprises a rectangular housing 31 having walls which may support (A) the various components illustrated and not shown, or (B) a frame supporting such components.

Formed in or secured to one end of housing 31 is a subhousing or recepticle 32 for receiving and operatively positioning the elongated magnetic belt containing magazine 10 through an opening 32A. The elongated opening in housing 11, from which record belt 20 is driven, is in alignment with an elongated opening or passageway 32C extending through a partition or wall 32C. While a pivoted door (not shown) may be hand or machine operated to close opening 32A in for operatively retaining magazine 10 in place, a detent containing assembly 32D is shown secured to the top wall of housing 31 and contains suitable spring operated means for frictionally or otherwise retaining magazine housing 11 in place during a transducing operation.

Once magazine is so operatively located, the end of its magnetic belt 20 may be automatically engaged by one of the mechanisms 33 described in FIG. 9. Belt 20 is thereby disposed between a first pair of powered rolls or drive wheel pairs 33A and 33B which drive it between second pair of powered rolls 34A and 34B which feed belt 20 to a space 35S between a semicylindrical receptacle 35 and a cylindrical disc or drum 39D which is supported to be both power-rotated and driven axially to position one or more magnetic heads 40A and 40B supported thereby with respect to a select portion of a select record track of belt 20 and to cause same to operatively scan the select track in a magnetic recording or reproduction transducing operation. Belt 20 is driven by a series of powered rollers or wheels 35R which frictionally engage the rear surface of border portions of belt 20 against the surface of drum 39D. Wheels 35R advance belt 20 to another set of powered rollers 36A and 36B which feed it to a final set of powered 37A and 37B which dispose the end of belt 20 in an open container 38 for temporary storage while a select length of belt 20 is located in alignment with the transducing drum 39D within space 35S between drum 39D and semicylindrical receptacle or retainer 35 in a semicylindrical configuration therein to permit the magnetic heads 40A and 40B of drum 39D to scan select longitudinal record tracks of belt 20.

Magnetic transducing with respect to a select portion of a select track of the closely spaced multiple magnetic record tracks of belt 20 is effected after a select portion of the length of belt 20 is operatively aligned with the cylindrical drum or disc 39D as the disc rotates and causes its magnetic head or heads 40A and 40B to scan a select track of belt 20 at the transducing location defined by drum 39D and guide 35. Two magnetic transducers or heads 40A and 40B are shown diametrically supported by the drum 39D to scan the same or adjacent tracks of (A) magnetic belt 20. Heads 40A and 40B may be constructed to perform either or both the functions of magnetically recording information derived from a source of (B) information signals such as a memory, video camera or other signal generating means or of magnetically reproducing select information previously recorded along a select length of a select track of magnetic belt.

The magnetic transducing apparatus 39 includes drum 39D and may be made in accordance with the teaching of my copending U.S. Pat. application Ser. No. 07/13127 and its parent U.S. Pat. Nos. 4,642,705 and 4,578,717. My earlier disclosures provide for magnetic recording along select tracks of a flexible magnetic card after a portion of the length of such card is deformed into the configuration of a semicylinder a drum or disc supported magnetic head is caused to rotate and scan a select track of such card after such support is driven along an axis extending laterally or transversely with respect to the longitudinal axis of the card and has aligned its magnetic head with a selected ones of multiple parallel tracks of the card.

Accordingly the apparatus of FIG. 9 also includes means for power driving drum 39D laterally across belt 20. At the same time a magnetic pick-up head or other scanning device moves laterally with drum 39D but does not rotate therewith and scans marker recordings or codes recorded at spaced locations. One of these locations is aligned with such pick-up scanning device each time a select length of belt 20 is predeterminately positioned at the transducing location. Such an operation provides suitable feedback signals to effect precise lateral drum and head alignment with the select track of belt 20 before scanning is effected.

A computer or microprocessor and circuitry affects control of the driving movement and longitudinal positioning of magnetic belt 20 from housing 11, through the spacing 35S to position a select length thereof, such as a length containing select recording frames, as well as control of the motor or motors laterally positioning drum 39D to align its magnetic transducer or transducers with a select track of the belt. The computer or microprocessor and circuitry is programmed by manual keyboard operation and/or computer (not shown) and is operable to generate control signals for starting and precisely stopping belt 20 and drum translation motor drives to precisely position belt 21 thereby properly locating its select length at the transducing location. Generated control signals also operate drum 39D to align its head or heads 40A and 40B with the select track of belt 20 to operatively scan the select portion of such track and effect either the recording of select information therealong or the reproducing of information previously magnetically recorded therealong.

Feedback signals, generated as belt 20 is driven from housing 11 along the select path described, may be employed to effect proper alignment of the select length of belt 20 at the transducing location. Such feedback signals may be generated by one of a number of techniques and applied to uncount a preset counter or to activate a comparator circuit. Either of which operates, when an uncount or comparator matching function occurs, to generate a control signal and apply same to a braking means to properly stop movement of belt 20 when the select length thereof is aligned with drum 39D. Such feedback signals may be generated by (A) a rotary counter operated by the shaft of one of the belt drive motors employed to drive the wheels or rollers for driving the belt from the housing 11, and/or (B) by scanning marker signals or codes recorded along a select track of the belt, such as a border track thereof, at each frame location or at select equal lengths of belt 20.

In a preferred form of the apparatus 30, control computer operates to simulatenously effect lateral movement of drum 39D and longitudinal movement of belt 20 so that there will be little or no delay in effecting scanning movement of the transducer(s) 40A and 40B once the select length of belt 20 is operatively aligned at the transducing location due to the fact that drum or disc 39D is at or close to the lateral location of the select track. If belt 20 is in precise lateral alignment at the transducing or recording location by lateral guides (not shown), and the record tracks thereof are precisely located laterally across belt 20, then at least initial, if not all, lateral movement of drum 39D may be controlled by a count-down counter counting the rotations of the shaft of the gearmotor or stepping motor driving drum 39D laterally with respect to the belt 20.

After all select recording and/or reproduction operations have been completed with respect to one or more select lengths of a select track or tracks of belt 20, the control computer operatively controls the operation of the belt driving motors to reverse drive belt 20 into housing 11 as described. When belt 20 is completely driven into housing 11 and housing 11 is closed or sealed as described, a signal may be generated by the computer or a sensor, such as a switch which is activated when it senses the end of belt 20 or the closing of a door across the opening in housing 11. The same signal may be applied to operate or deactivate a warning light, sounding transducer and/or a motor or solenoid releasing a hold on the magazine housing 11 and/or ejecting the magazine 10 from receptacle 32.

FIG. 10 shows a modified form of the apparatus of FIG. 9 for transducing with respect to a select length or frame location of a magnetic belt 20 of the type described above, which is controllably driven from an elongated magazine 10 of the type described. Such transducing is effected while a select portion of the length of belt 20 is maintained in a flat condition by a transducing apparatus similar to that disclosed in my U.S. Pat. No. 3,818,500 like which employs one or more magnetic transducer heads 79 supported for operable movement in a direction parallel to the longitudinal axis of the belt and in a direction laterally across the belt 20 to position the head(s) 79 in alignment with a select track of the parallel record tracks of belt 20.

The apparatus 50 includes a housing 51 which is either rigid enough to support all equipment per se or a frame (not shown) supporting such equipment. The housing 51 includes a receptacle 52 for operatively retaining a magnetic belt containing magazine 10 of the type described. Such magazine 10 is inserted into an opening 52A in the receptacle or housing 52. A motor, solenoid or detent mechanism may be employed to operatively retain and prevent removal of magazine 10 from receptacle 52 while belt 20 is driven therefrom thereby preventing damage to belt 20.

Such motor, solenoid or detent mechanism may be controlled by a sensor or computer which operates to control all motors and devices necessary to effect one or more select recording and/or reproduction operations with respect to select recording areas of magnetic belt 20. A mechanism 53 of the type described is supported in housing 51 or receptacle 52 and is operable, when operated after magazine 10 is operatively located in receptacle 52, to engage either the end of belt 20 or a mechanism supported by the magazine housing, 11 and drive belt 20 between a first pair of drive rolls 54A and 54B or drive wheel pairs operable to grip the border portions of belt 20 and drive it to the upper surface 55S of a rigid platen 55. Belt 20 is driven along platen 55 by a plurality of drive rolls 60A to 60F to and beyond the far end of or table or platen 55. Belt 20 moves therefrom between powered rolls or pairs of drive wheels 61A and 61B which drive belt 20 into an open container 63 in which belt 20 rolls or folds for storage. This process continues until the select length of belt 20 is predeterminately positioned with respect to the magnetic transducing apparatus 70 located in the central portion of housing 51.

The magnetic transducer 79 or a bank thereof, is movably supported on a mount 78 and projectable therefrom by a solenoid or motor against or operatively close to the upper surface of the magnetic belt 20 preferably drawn across flat upper surface 55S of table or platen 55 by the computer controlled operation of the motors driving rolls 60A and 60F and the series of rolls therebetween. The mount 78 is guided by a guideway or track extending laterally across table 55. The guideway (not shown) is supported by a second carriage 75 moveable longitudinally along a second track or guideway supported by end brackets or blocks 72 and 73 of a frame 71 supported by the walls of the housing 51.

As in the operation of the apparatus of FIG. 9, a master controller or computer controls the operation of (A) all motors employed to predeterminately position belt 20 across table 55 and (B) the motors operable to project and retract head 79, and laterally and longitudinally move its support with respect to table 55 and belt 20 during select scanning operations. The computer may be operable to initiate lateral movement of head 79 for locating it to a lateral position near the track selected for transducing. Thus when the select portion of the length of belt 20 is predeterminately located at the transducing location on the upper surface 55S, only a brief amount of time will be required thereafter to align head 79 with the select track of belt 20 prior to projecting head 79 and longitudinally driving it in scanning movement with respect to the select portion of the select track thereof.

To effect such lateral movement and preliminary positioning of the magnetic heads of the apparatus of either FIGS. 9 or 10, pulses, generated by a rotary limit switch or shaft resolver coupled or connected to the shaft of the motor which effects coarse lateral driving of the transducer mount, may be applied to uncount a counter. Such counter is preset by the computer while the laterally moving transducer carriage or mount is at a home location which may be at the center of belt 20 or to one side thereof. Thereafter, the transducer mount driving motor may be pulsed to start same and initiate lateral driving movement of the transducer mount. If the transducer mount reaches a predetermined location in the vicinity of where the select track of belt 20 will be located when belt 20 is predeterminately tensionally disposed when stopped against the upper surface table 55S or is at a select length of belt 20 operatively located in the spacing 35S, prior to such belt positioning, it may be stopped in its lateral travel when the counter uncounts and applies its control pulse to the stop control of the motor. When belt 20 attains it operative longitudinal positioning and its drive is stopped, the same control signal employed to the brake or motor to effect stoppage of belt 20 may also be applied to initiate operation of the motor employed to laterally drive the transducer mount. At the same time either the same transducer or a bank of tracking transducers supported on the same mount parallelly scan track defining codes recorded on each track along bands thereof defining each frame determining length of belt 20. This causes precise alignment of the transducer with the select track by electronically comparing the track codes with the code of the select track generated by the computer.

As in the operation of the apparatus of FIG. 9, when one or more select transducing operations have been effected with respect to one or more select portions or frame lengths of select tracks of belt 20, the operator or a computer may effect the generation of a control signal. Such control signal is applied to control the belt drive motors to reverse drive or release tension on belt 20 so that it may be returned to the housing 11 under the action of the wound drum spring(s) and/or the driving action of the motors. An indicating device such as a lamp or bell may also be activated along with a solenoid or motor indicating that belt 20 has been completely returned to storage in the magazine housing 11 and magazine 10 may be removed or rejected from subhousing or receptacle 52.

In a modified form of the invention of FIG. 10, the platform or table 55 may be eliminated if belt 20 is positioned for transducing by tensionally drawing same between two sets of powered roller or respective pairs of powered wheels frictionally holding spaced apart portions of the borders of belt 20 to dispose the select frame location of belt 20 therebetween in a controlled tensioned condition. Guidance of belt 20 between such rollers may be effected by additional rollers or wheels or guides at the sides of belt 20 out of the way of transducer(s) 79. Such guides may remain in place against belt 20 or retracted therefrom while transducer 79 is projected against select track of belt 20 and caused to scan the select portion thereof at the transducing location.

FIG. 11 shows a recording arrangement relating to a wide magnetic belt 20 of the type described and the apparatus of FIGS. 9 and 10. The portion of belt 20 shown contains a first code track 20CT along which may be recorded series digital codes indicative of the starting location of each select length of belt 20. Three series digital codes 20A, 20B and 20C are shown. Each of such select lengths is preferably the same length as the others. Preferably, but not necessarily, each select length contains recordings of the same length or duration, such as analog or digital full frame video picture signals. Such signals define pages of digitized documents or alpha-numeric characters generated by keyboard or typewriter, pages of graphical data or computer generated data, etc.

Disposed between each select frame containing length of belt 20 are respective laterally extending portions or band-like areas 20B1, 20B2, 20B3 etc. which contain respective different series codes along the plurality of parallel record tracks 20T1 to 20TN. Each of the series codes prerecorded in the bank-like areas or lengths 20A, 20B and 20C of belt 20 are laterally aligned with the bits of the codes aligned with each other along respective lateral record tracks permitting a bank of magnetic pickups. Such pickups are supported by the mount for the main transducers 40A, 40B and 79 to parallel scan such codes and generate parallel output codes for application to an electronic comparator in effecting the described operative alignment of the main transducer(s) with the select track 20T of belt 20 to effect proper scanning thereof as described.

Modifications to the apparatus described which form part of the invention are noted as follows:

1. Contact of the transducing end of the magnetic head or heads may be made between the surface of the magnetic belt 20 prior to and/or during a transducing operation with respect to a select portion of a select track of magnetic belt 20. At the same time the magnetic head or heads may be kept a short distance away from the magnetic recording surface of the belt during transducing by one or more means. This includes the provision of a film of air between the head and belt caused either by rapid movement of the head, such as its rotation as in FIG. 9 or by ejecting compressed air from the head or head mount to float the head off the belt, as in the arrangement of FIG. 10.

In the operation of the apparatus of FIG. 9, the rapidly rotating drum 39D may be driven at 1800 revolutions per minute or more and is operable to generate a thin film of air between belt 20 and the cylindrical surface of drum 39D. The thin air film will retain the surface of belt 20 out of contact with drum 39D and heads 40A and 40B if the head operating end is located in the cylindrical plane of the surface of drum 39D. Such distance will be 0.0002" or less for effective operation of the magnetic head in recording and/or sensing magnetic recordings on the select tracks of magnetic belt 20. Such air may also be ejected from a plurality of passageways and surface openings in the cylindrical surface of drum 39D, aligned with belt 20. The air is pressurized either by a compressor and/or when received by a suitably shaped inlet having an airscoop and suitably located on the drum out of the way of the belt.

2. If the guide 35 or the platen 55 is made of a paramagnetic material or is a magnet, suitable permanent or electromagnetic means supported by a movable mount for the magnetic head or heads may be employed to retain the head(s) a select distance away from the surface of the magnetic belt by the force of magnetic repulsion therebetween. If the belt is unsupported as described above, along the select length thereof which is stopped at the transducing location, the magnetic head(s) may be made to contact the portion of the unsupported length of the belt containing the select track during the transducing-scanning operation, without undue wear on the tape.

3. In a modified form of the apparatus of FIG. 10, magnetic head(s) 79 may be movable only in a direction across the belt to align head(s) 79 with a select belt track when a select portion of the length of belt 20 is operatively aligned with the transducing location or station, such as table 55 or rollers between which the belt is tensionally drawn. After magnetic head(s) 79 is operatively positioned or engaged with the select belt track, scanning movement may be effected thereafter by further controlled driving of belt 20 in the proper direction past the stationary and operatively aligned head(s) 79. To conserve transducing time, the computer controlling the operation may be operable to drive belt 20 in either direction depending on the location of belt 20 and the information sought, during a transducing operation wherein the resulting recorded information or the recorded information scanned may be discriminated and used whether or not it is scanned in a forward or reverse direction.

4. Electro-optical information may be recorded as frames or messages along select lengths of select tracks of an optical recording belt by a suitable recording laser and reproduced by a laser reading system, which replace the magnetic heads of FIGS. 9 and 10, reference being made to my U.S. Pat. Nos. 4,598,717 and 4,213,162 for further details of such recording technique using a laser.

5. Magnetic heads 40A, 40B and 79 of FIGS. 9 and 10 may be replaced by suitable solid state lasers and attendant optical components for effecting the rapid and automatic reading of data recorded as microcavities, pits or otherwise shaped variations in the topography of the recording material of the belt or as electro-optically readable changes in internal structure or color. However, such magnetic heads may be replaced by an electro-optical scanning system employing means for rapidly deflecting a narrow beam of collimated radiation, such as a coherent laser beam, and causing same to scan the selected track or tracks of the portion of the belt which is aligned at the transducing location.

Such scanning means may comprise one or more deflection controlled mirrors and/or other optical components which are pivoted and/or otherwise driven in response to control electrical signals to cause the beam to scan the select track for recording thereon and/or reproducing therefrom. Such deflection controlled laser or beam scanning system may be mounted directly above the record belt at the transducing location with the laser thereof being supported stationary or motor drivable in either or both longitudinal and lateral directions to position the beam thereof aligned with a select track of the belt at the transducing location and/or to cause it to scan the select track.

6. In still another form of the invention illustrated in FIG. 10, the magnetic transducer 79 may be supported by a mount which is operable to drive the transducer laterally across the belt 20 from either or both sides thereof while the belt is in motion or stopped, to cause the transducer to scan and transduce with respect to a select magnetic track which is normal to the longitudinal axis of the belt if the belt is stationary during scanning or is at an angle to the longitudinal axis of th belt if the belt is in motion during such scanning. Each lateral track may have its own code recording aligned with the track to be reproduced by a bank of stationary magnetic pick-ups as the belt is driven and applied to an electronic comparator or comparators which are programmed with the code or codes of select lateral tracks of the belt to be recorded on and/or reproduced from by the laterally movable magnetic head or heads. Such laterally scanning magnetic head may be operable to scan the select laterally extending track or tracks of the belt in one direction thereacross while the belt is stationary or in movement in a given direction by returning to the start-scanning side of the belt before starting the next track scan or may be operable to scan one track in one direction and then the next track or another track in the reverse direction in a manner to permit closely spaced adjacent tracks to be so scanned while the belt is in motion.

In the magnetic transducing arrangemente of FIGS. 3 and 4, a computer may be employed to control the driving of the magnetic belt 20 from storage in the magazine housing 11. Such computer may be used to operatively position the select belt length with respect to the magnetic transducing apparatus and to controllably operate the latter in a select transducing operation to selectively record on or reproduce information from one or more select record tracks along such select length of the magnetic record belt. If the location of the select track is known, it may be indicated by coded electrical signals generated by the computer or other means, such as a keyboard, card reader, light pen, speech recognition control system or the like. Then, the magnetic transducer may be controllably moved to attain operable alignment with a select track before the select portion of the magnetic belt is operatively disposed at the transducing location.

What is claimed is:

1. An apparatus for transducing information, said apparatus comprising:
   (a) a magazine having an elongated housing defining an enclosed container,
   (b) an elongated flexible record belt having a width shorter than the length of said housing and containing a plurality of parallel record tracks along most of its length,
   (c) an elongated spool having a length less than the length of said housing and shaped to contain said belt wound in a coil formation thereon and unwindable therefrom,
   (d) means for rotationally supporting said spool for rotation about its longitudinal axis within said housing,
   (e) one end of said belt being secured to said spool,
   (f) an elongated narrow opening in said housing extending parallel to the rotation axis of said spool and greater in length than the width of said belt, said opening configured to permit said belt to longitudinally travel through said opening in unwinding from said coil and in rewinding on said coil,
   (g) means for supporting and normally retaining the free end of said belt aligned with said opening in said housing when said belt is fully wound in said spool for storage in said housing,
   (h) transducing means including a support for said magazine and a transducer movably supported on said support at a transducing location,
   (i) means for engaging and driving said free end of said belt through said opening when said magazine is operatively supported by said support, and guiding said belt along a fixed path to said transducing location to position a select length of said belt at said transducing location,
   (j) means for effecting controlled driving movement of said transducer and energizing said transducer as it moves to cause it to scan and transduce with respect to a select of said parallel record tracks extending along the portion of said belt at said transducing location.

2. An apparatus in accordance with claim 1 including means for power-rotating said spool within said housing in a direction to wind said belt thereon and return the length of said belt to said housing after the completing of a transducing operation with respect to a select portion of said belt.

3. An apparatus in accordance with claim 2 wherein said means for power-rotating said spool comprises spring means supported by said housing and engaging said spool and said housing in a manner to store spring energy as said belt is removed from said housing, uncoils from and rotates said spool.

4. An apparatus in accordance with claim 1 wherein said means for power rotating said spool comprises a motor operated means supported by said support for coupling and uncoupling to said spool in said housing and operable, when coupled thereto, to drive said spool in a belt winding direction, and control means for said motor operated means for controlling same to completely wind a belt driven from a housing supported by said support back onto the spool of the magazine defined by said housing in a manner to operatively dispose the free end of said belt in alignment with said opening.

5. An apparatus in accordance with claim 1 including means for closing said opening to seal said housing when said belt is operatively stored in said housing.

6. An apparatus in accordance with claim 5 wherein said means closing said opening is operated by the movement of the free end of said belt through said housing.

7. An apparatus in accordance with claim 5 wherein said means closing said opening is attached to said belt.

8. An apparatus in accordance with claim 5 wherein said means closing said opening comprises a closure movably supported by said housing, means supported by said support and operable when a magazine is operatively located on said support for automatically moving the closure of said magazine to uncover said opening and after a transducing operation is complete with respect to the belt of a magazine supported by said housing and the belt is driven back into said housing for storage, for automatically moving said closure to cover said opening in said housing.

9. An apparatus in accordance with claim 1 wherein said belt contains said record tracks extending parallel to the longitudinal axis of said belt, and means for driving said transducing means across said belt to align it with a selected of said parallel record tracks prior to effecting, said driving movement of said transducing means in scanning said selected of said parallel record tracks.

10. An apparatus in accordance with claim 1 including means at said transducing location for deforming a select portion of the length of said belt into the configuration of a partial cylinder, means for rotationally supporting said transducing means at said transducing location and driving said transducing means in rotation within the deformed portion of said belt to permit it to scan and transduce with respect to said parallel record tracks extending along said deformed portion of said belt, and means for moving said transducing means along an axis parallel to its rotational axis to bring said transducing means into alignment with a selected of said parallel record tracks before effecting a scanning transducing operation with respect to said select track at said transducing location.

11. An apparatus in accordance with claim 1 including means supported by said support at said transducing location for supporting said belt in a flat condition thereat, said means effecting controlled driving movement of said transducer including guide means for guiding said transducer in a first path with respect to said belt to position said transducer in alignment with said select of said parallel record tracks at said transducing location.

12. An apparatus in accordance with claim 1 including means supported by said support for controllably applying tension to the portion of said belt at said transducing location to preposition and condition said belt for transducing thereat.

13. Information transducing apparatus comprising:
   (a) a first support,
   (b) first means supported by said first support for prepositioning and holding a magazine having a housing which contains an elongated length of flexible sheet-like record member having a plurality of parallel record tracks provided along most of the length of said record member, said housing having an elongated narrow opening in a wall thereof, (c) said record member being wound in a coil formation within said housing, (d) second means supported by said first support for automatically driving a record member of a magazine through said opening in an uncoiling operation from said magazine housing, said second means operatively positioning and fixedly holding said record member in a fixed transducing location on said fixed support, (e) third means supported by said first support for transducing information with respect to said record member, (f) fourth means for power-driving said transducing means in a select path to permit said transducing means to effect a scanning transducing operation with respect to a select track of said record member at said fixed transducing location, (g) first control means for controlling the operation of said second means to cause it to operatively drive and position a select portion of said record member at said transducing location, (h) second control means for controlling the operation of said fourth means after a select length of said record member is operatively positioned at said transducing location to cause said transducing means to scan a select track along a select portion of said record member, and (i) said second control means including means for controlling the operation of said transducing means as it scans said select track to cause it to effect a select transducing operation with respect to said select track at said scanning location.

14. A method for magnetically reproducing information from select recordings of an elongated flexible magnetic belt record member said method comprising the steps of:

(a) controllably driving and guiding a flexible elongated magnetic belt-like record member out of a magazine storing said record member, which record member has a multitude of closely spaced parallel record tracks containing magnetic recordings which extend parallel to each other along different portions of said record member until a select portion of said record member is aligned at a fixed transducing location, and (b) collecting and storing the free end of said record member in a storage means beyond said transducing location, and (c) stopping the driving of said record member so that said select portion of said record member is predeterminately stopped at said transducing location, (d) causing a magnetic reproduction transducer to scan selected of said parallel record tracks extending along said select portion of said record member at said transducing location, (e) thereafter causing said magnetic reproduction transducer to magnetically reproduce select information recorded on said select portion of said record member by scanning a select record track thereof at said transducing location, and (f) thereafter automatically reverse driving and guiding said magnetic belt-like record member back into said magazine.

15. A method in accordance with claim 14 wherein said stopping step includes allowing said transducer to align itself with respect to a select record track of said record member along said select portion of said record member.

16. A method in accordance with claim 15 including predeterminately configuring said record member at said transducing location prior to causing said transducer to scan said select track of said record member.

17. A method for reproducing select information from select recordings provided on a select portion of an elongated flexible record member, said method comprising the steps of:

(a) controllably driving and guiding the end of a flexible elongated record member along a select path out of a magazine in which said record member is stored, wherein said record member has recordings extending along closely spaced parallel record tracks of said record member and wherein different portions of the length of said record member contain recordings of different information provided on respective closely spaced record tracks, (b) continuing said driving and guiding step until a select portion of said record member is aligned at a fixed transducing location external of said magazine, (c) collecting the free end of said elongated record member in a storage means located among said select path beyond said transducing location (d) stopping the driving of said record member so that said select portion of said elongated record member is stopped at said transducing location, (e) automatically scanning selected of said parallel record tracks on the record member fixedly disposed at said transducing location by effecting the controlled scanning movement between a sensing means for the recordings of said record member and said selected parallel record tracks and generating select information signals of select recordings scanned, (f) after all the select information recorded on said record member has been selectively scanned and the information defining same has been generated as select information signals, automatically reverse driving said elongated flexible record member among said select path back into said magazine to dispose same for storage therein.

18. A method in accordance with claim 17 including deforming said select portion of said elongated flexible record member into the configuration of a partial cylinder at said transducing location and causing said sensing means to scan a select portion of the deformed portion of said flexible record member defined by at least one track of said record member which extends in a semicircular path along that portion which is cylindrically configured.

* * * * *